Nov. 12, 1957  H. J. McHUGH  2,812,974
REMOVABLE TRANSPORT-CONTAINER LOCKING MECHANISM
Filed Sept. 22, 1955  3 Sheets-Sheet 1

INVENTOR:
HUBERT J. McHUGH
BY
ATT'YS

Nov. 12, 1957     H. J. McHUGH     2,812,974
REMOVABLE TRANSPORT-CONTAINER LOCKING MECHANISM
Filed Sept. 22, 1955     3 Sheets-Sheet 2

*INVENTOR:*
HUBERT J. McHUGH

BY
ATT'YS

Nov. 12, 1957      H. J. McHUGH      2,812,974
REMOVABLE TRANSPORT-CONTAINER LOCKING MECHANISM
Filed Sept. 22, 1955      3 Sheets-Sheet 3
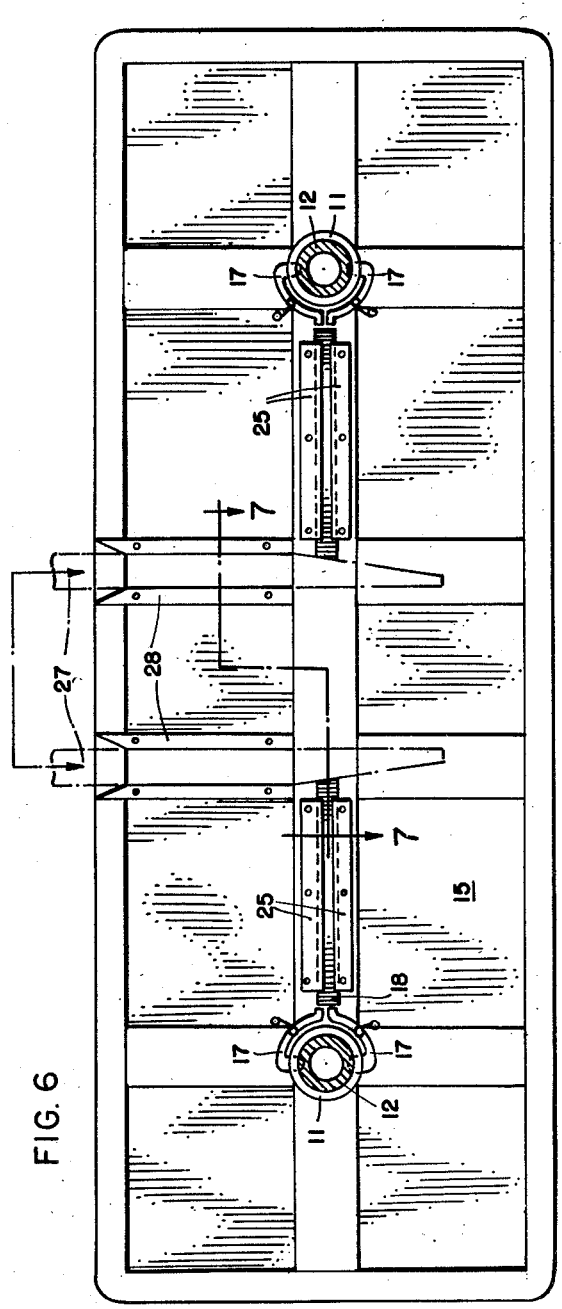
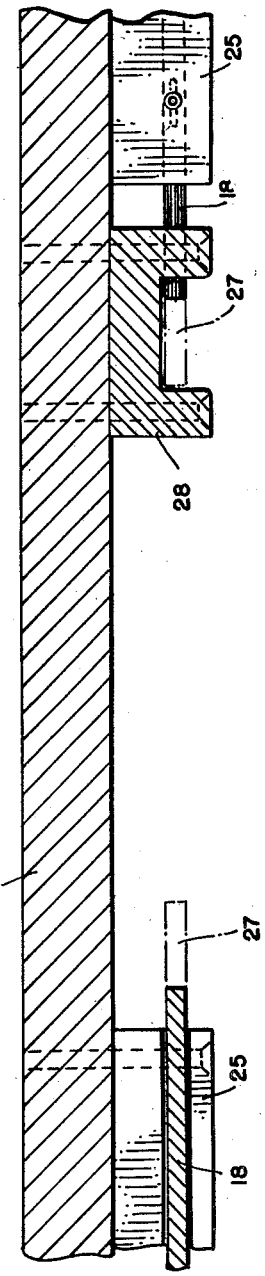
*INVENTOR:*
HUBERT J. McHUGH
BY
ATT'YS 2,812,974

REMOVABLE TRANSPORT-CONTAINER LOCKING MECHANISM

Hubert J. McHugh, Chicago, Ill.

Application September 22, 1955, Serial No. 536,001

2 Claims. (Cl. 296—35)

This invention relates to releasable locking mechanism for removably securing shipping containers on various transport vehicle chassis.

The main objects of this invention are to provide an improved mounting for shipping containers on transport chassis to make convenient the positioning of a container on and removal from a chassis either before or after loading; to provide improved retractable locking means for removably securing the container on the chassis; and to provide an improved releasably locked mounting of this kind which is so simple in construction as to make its manufacture extremely economical and its use highly effective where either gantry cranes or fork-type lift trucks are used for handling the container to and from the chassis.

In the adaptations herein shown in the drawings:

Fig. 6 is an underside plan view of a modified arrangement of the releasable locked mounting; and Fig. 7 is a longitudinal sectional view of the same taken on the plane of the line 7—7 of Fig. 6.

Figure 1:
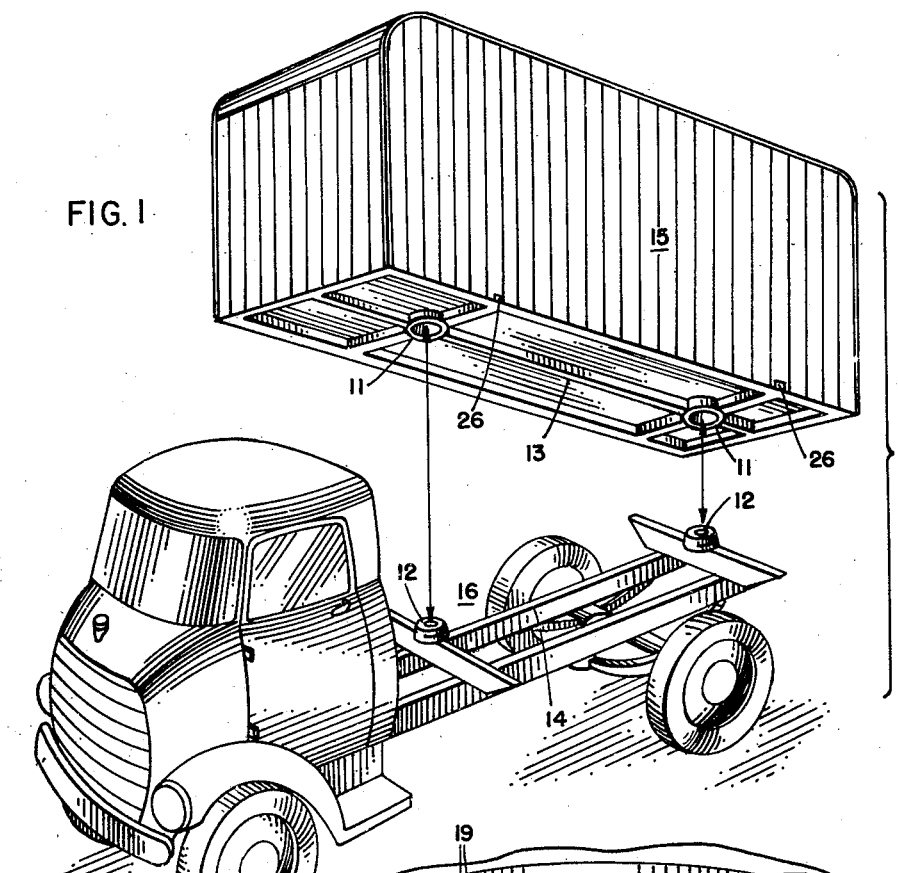
Figure 1 is an exploded perspective view showing the releasable mounting as applied to a motor transport vehicle.
Figure 2:
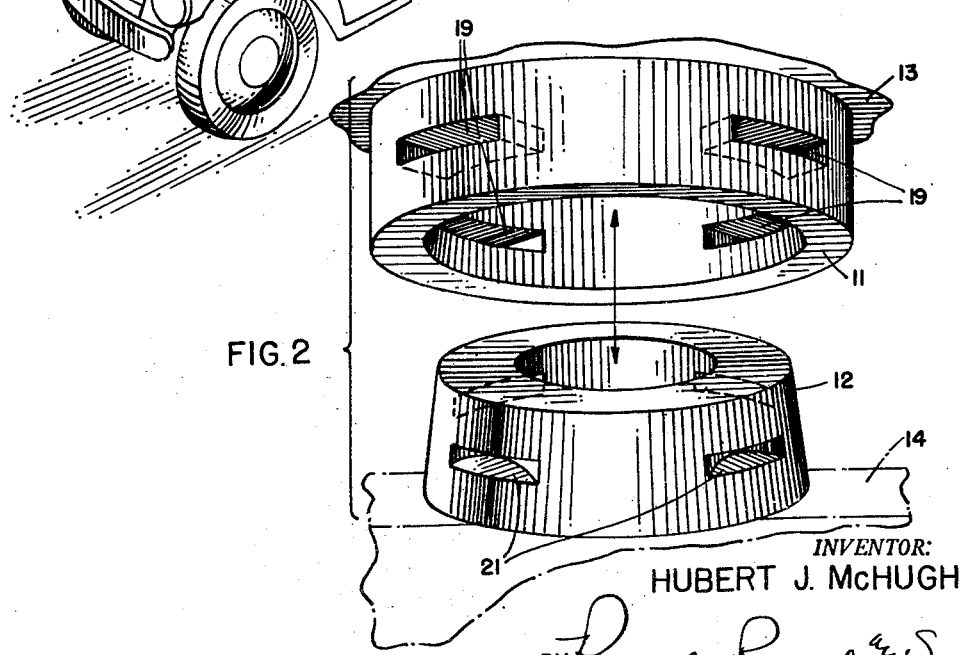
Fig. 2 is an enlarged and exploded perspective of a mounting without the locking mechanism.
Figure 3:
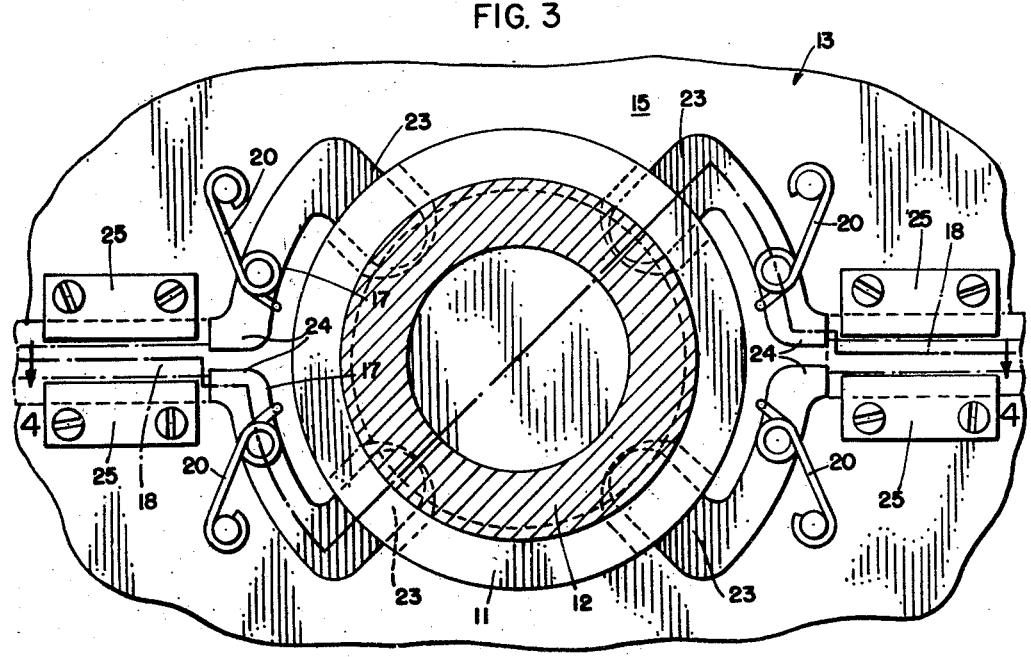
Fig. 3 is an enlarged, underside plan view of a mounting and its associated releasable locking means.
Figure 4:
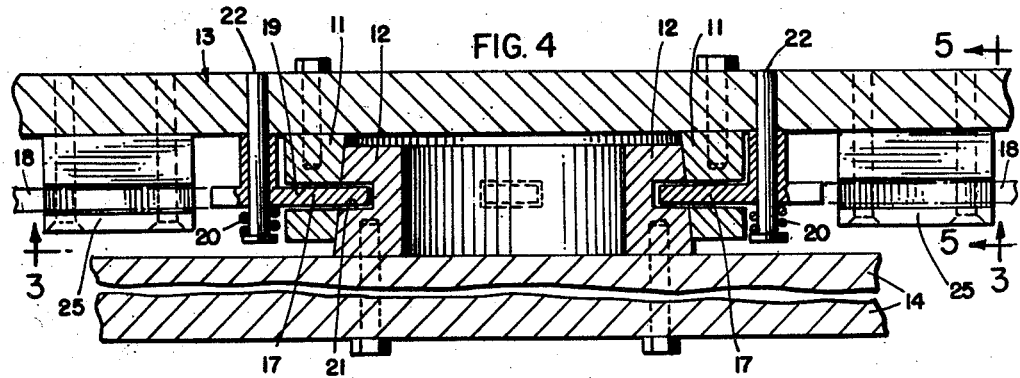
Fig. 4 is a transverse section of the same as viewed from the plane of the line 4—4 of Fig. 3, the line 3—3 indicating the plane of the view shown in Fig. 3.

The essential concept of this invention involves telescopically interfitting elements interlocked in their assembled relationship by retractable spring-actuated pawls extending through registering recesses in the telescoped elements.

A mounting embodying the foregoing concept comprises one or more pairs of telescoping ring and hub elements 11 and 12 respectively secured to the opposed frame members 13 and 14 of a container 15 and chassis 16 of a transport vehicle, and each of which pair of elements is releasably locked in its telescopically interfitting relationship by spring-actuated pawls 17 retractable, when desired, by the shifting of a bar 18 so as to permit the removal of the container 15 from the chassis 16 or its replacement thereon.

The ring and hub elements 11 and 12 have their abutting telescoping faces of frusto-conical form. This makes for their easy and sure entrance into telescoping relationship and insures a firm assembly in such relationship. Circumferentially these elements are formed with one or more pairs of diametrically-opposed radial recesses 19 and 21 respectively.

A pair of ring elements 11 are here shown integrally formed with the base frame members 13 of the container 15 in spaced relationship along the longitudinal median. The hub elements 12 are here shown similarly integral with the frame members 14 of the chassis 16.

The locking pawls 17 are here shown to be substantially bell-crank type. They are arranged in pairs, being pivoted at 22 to the container frame members 13 in position for the free ends 23 to rock into and out of the registering recesses 19 and 21 and with the opposite ends 24 disposed adjacent each other in alignment with the retracting bar 18. Conventional wire springs 20 normally urge the pawls 17 into locking position.

The requisite pawl-retracting bars 18 are here shown slidably supported in pairs of opposed recessed brackets 25. The brackets 25 are attached to the container frame members 13 so as to position one end of each bar 18 in alignment with the adjacently-disposed ends 24 of a pair of pawls 17.

The arrangement of the pawls 17 and the retracting-bar brackets 25 are accommodated to the type of lifting equipment to be used in removing a container 15 from and its replacement on a chassis 16. The adaptations here shown are believed to be most practical for a gantry crane and a forked motor-lift truck, respectively. Figs. 1–5 illustrate an adaptation for use with a gantry crane, whereas Figs. 6 and 7 illustrate an adaptation for use with a forked motor-lift truck.

Figure 5:
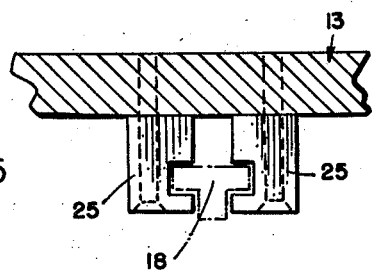
Fig. 5 is a fragmentary, cross-sectional detail taken on the line 5—5 of Fig. 4.

In Figs. 1 and 5 pairs of pawls 17 are arranged 90 degrees apart and with the retracting-bar supporting brackets 25 disposed transversely of the container 15 adjacent the front and rear ends thereof. Openings 26 are formed in the lower sides of the container 15 in alignment with the brackets 25 to receive the bars 18 required in the use with a gantry crane.

In Figs. 6 and 7 the pairs of pawls 17 are shown arranged 180 degrees apart and with the bar-supporting brackets 25 longitudinally disposed medially of the container 15. In this adaptation, the opposed ends of the bars are spaced apart a distance to permit the insertion of a fork 27, of a conventional motor-lift truck, into guideways 28 arranged on the bottom of the container transversely at one side intermediate the container ends.

The operation of this improved form of removable transport-container locking mechanism, quite obvious from the foregoing description, may be summarized as follows:

A container 13, in position on a chassis 16 and ready to be removed therefrom, would have either a gantry crane or motor-lift truck moved into position to effect such result.

Where a gantry crane is used, the bars 18 would be inserted through the container opening 26 and into the brackets 25 adjacent both pairs of mounting elements 11 and 12. The operation of the crane would cause the bars 18 to move inwardly to abut the adjacently-disposed ends 24 of the respective pairs of pawls 17 and retract the ends 23 from the mounting element recesses 19 and 21. Continued operation of the crane would lift the container 15 from the chassis 16 and permit its removal to a position remote from the chassis.

To replace a container 15 on a chassis with a gantry crane, the container, suspended from the crane, would be moved into position over the chassis and lowered to permit the entrance of the hub elements 12 into the respective ring elements 11. The bars 18 would hold the pawls 17 retracted to permit such reassembling of the elements 11 and 12. Upon relaxing the cables of the crane the springs 20 on the pawls 17 would retract the bars 18 and seat the pawl ends 23 in the registering recesses 19 and 21 of the respective mounting elements 11 and 12. Upon withdrawing the bars 18, the crane would be removed from the container-chassis assembly to allow the crane to be moved out of the way.

Where the motor-life truck is to be used to remove a container 15 from a chassis 16, the truck would be operated to insert the truck fork 27 into the guides 28 so that the inner tapered ends of the fork 27, contacting the opposed ends of the bar 18, would press the bars 18 outwardly to retract the respective pair of pawls 17. Thereupon an elevation of the fork 27 would lift the container 15 free of the chassis 16 and permit the transfer of the container to some other point.

To replace a container 15 on a chassis 16, with the motor-lift truck, the truck, mounting the container, would be moved to position to dispose the container over the chassis. The lowering of the container would permit the re-assembly of the pairs of mounting elements 11 and 12. The fork 27 would hold the pawls 17 retracted until the truck was moved away from the container, whereupon the springs 20, on the pawls 17, would retract the bars 18 and seat the pawl ends 23 in the registering recesses 19 and 21 of the mounting elements 11 and 12.

Although but two specific embodiments of this invention is herein shown and described, it will be understood that numerous details of the construction shown may be altered or omitted without departing from the spirit of the invention as defined by the following claims.

I claim:

1. A transport chassis, a container removably positionable on the chassis, a pair of hub elements on the chassis in longitudinally-spaced realtionship, a pair of similarly-spaced ring elements on the container disposed to seat the hub elements therein for removably positioning the container on the chassis, the interfitting elements having registering recesses formed therein, a pair of arcuate-shaped horizontally-disposed pawls hinged on vertical axes intermediate their ends to embrace each container ring element and spring-biased to normally extend one end of the respective pawls into the registering element recesses to lock the container in position on the chassis, the opposite ends of each pair of pawls being disposed contiguous to each other, horizontally-disposed oppositely-slidable bars opposedly positioned on the container longitudinally thereof for actuation to abut the contiguous ends of the respective pairs of pawls to retract the same to permit removal of the container from the chassis, and means forming guideways transversely of the opposed ends of the bars for the reception of a bar-actuating fork.

2. A transport chassis, a container removably positionable on the chassis, a pair of hub elements on the chassis in longitudinally-spaced relationship, a pair of similarly-spaced ring elements on the container disposed to seat the hub elements therein for removably positioning the container on the chassis, the interfitting elements having registering recesses formed therein, a pair of arcuate-shaped horizontally-disposed pawls hinged on vertical axes intermediate their ends to embrace each container ring element and spring-biased to normally extend one end of the resepctive pawls into the registering element recesses to lock the container in position on the chassis, the opposite ends of each pair of pawls being disposed contiguous to each other, a horizontally-disposed guideway fixed on the container in adjacent opposition to the contiguous ends of each pair of pawls, and pressure-actuable bar means reciprocable in each guideway to abut the contiguous pawl ends and retract the other pawl ends from the registering element recesses to permit removal of the container from the chassis.

References Cited in the file of this patent

UNITED STATES PATENTS

| | | |
|---|---|---|
| 1,259,397 | Hathaway | Mar. 12, 1918 |
| 1,479,796 | Endebrock | Jan. 8, 1924 |
| 2,117,067 | Ludington | May 10, 1938 |
| 2,429,532 | Stephen | Oct. 21, 1947 |